June 17, 1958      R. W. GERBY      2,839,426
METHOD OF COATING CARBONACEOUS ARTICLES WITH SILICON NITRIDE
Filed Jan. 21, 1954
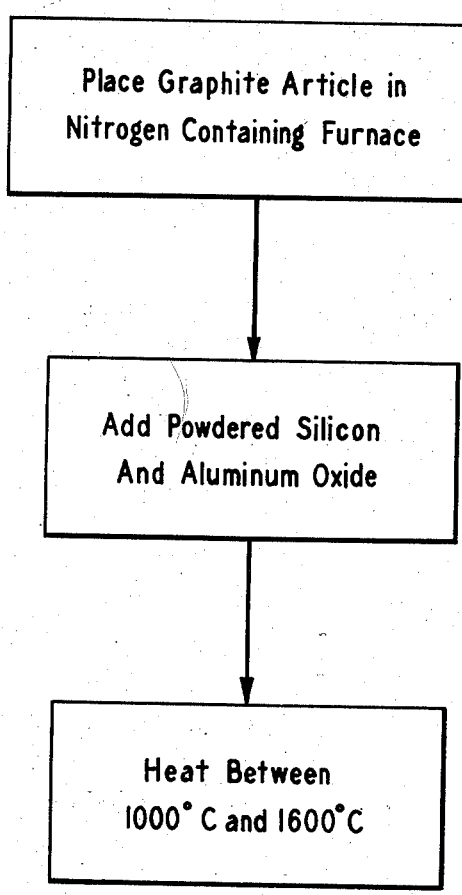
INVENTOR
RUSSELL W. GERBY
BY *Herbert J. Evers*
ATTORNEY

United States Patent Office 2,839,426
Patented June 17, 1958

2,839,426
METHOD OF COATING CARBONACEOUS ARTICLES WITH SILICON NITRIDE

Russell W. Gerby, Niagara Falls, N. Y., assignor to Union Carbide Corporation, a corporation of New York Application January 21, 1954, Serial No. 405,510

2 Claims. (Cl. 117—106)

This invention relates to an improved silicon nitride coating and a method of coating articles with silicon nitride, and more particularly concerns the coating of carbon or carbon-coated surfaces with silicon nitride.

Carbon articles possess properties which particularly well adapt them for use in situations where extremely high temperatures are encountered. However, since the element is comparatively soft and readily oxidized, its usefulness is limited to those applications where conditions are non-oxidizing, and where abrasion is not an important factor to be considered.

It has been found that the life of carbon articles can be greatly extended if they are protectively coated with a substance having a high degree of resistance to oxidation and abrasion. A coating imparting such protection and preservation is silicon nitride.

Heretofore, in plating a carbon article with silicon nitride, several difficulties have been encountered. One of the most serious of these problems concerns the uneven and disproportionate deposition of the coating material over the area intended to be plated.

Another difficulty involves controlling the rate of formation of the silicon nitride coating to achieve proper thickness, quality, and bonding action. For instance, if the nitriding process reaction proceeds at a rapid rate, intimate bonding of the nitride coating over the surface of the carbon article is not achieved.

In order to obviate the above indicated difficulties, there is provided herein an improved method of coating a carbonized article with silicon nitride, wherein the object to be coated or treated is enclosed in an oxygen-free, nitrogen containing atmosphere in the presence of silicon metal, and heated to effect the formation of a uniform thickness, hard wearing coating of silicon nitride over said object.

It is, therefore, an important object of the present invention to provide an improved method of coating carbonaceous or carbon coated articles with silicon nitride to effect a relatively impervious, hard wearing, protective outer layer and to impart corrosion-resistance and abrasion-resistance to such coated article.

Another important object of the present invention is to provide an improved coating for carbon or carbon coated articles for affording means for using the article in applications requiring extreme wear-resistance.

Other objects, features and advantages of the present invention will be apparent from the following detailed description.

In the drawing the single figure is a flow diagram illustrating the process of coating articles with silicon nitride in accordance with the present invention.

As a means for accomplishing the objects of the present invention, a carbon article, preferably a graphite article, is dipped in or sprayed with a slurry of powdered silicon metal plus aluminum oxide or preferably with a suspension of a mixture of finely divided silicon metal (150 mesh size—i. e. capable of passing through a screen having 0.104 mm. openings), 0.5% to 10% aluminum oxide, and a water soluble binder such as glucose. The thus treated carbon article is dried and heated in a closed, nitrogen filled furnace to between 1000° C. and 1600° C. to react the silicon metal with the nitrogen gas and form a silicon nitride coating.

To assure complete reaction of the silicon metal with the surrounding nitrogen, the high temperature condition in the furnace may be maintained for as long as 48 hours, although a shorter or longer period of time might be adequate.

In the temperature range to be used in the practice of the invention, the silicon metal may react to a slight degree with the carbon article with little noticeable effect on the adherence of the silicon nitride coating which is keyed into and seals the anastomozed pores adjacent to the outer surface of the graphite article.

In order that the invention may be more clearly understood, it may be noted at this point that some carbons oxidize at a different rate from other carbons. For example, in a graphitized carbon article made from carbon particles and pitch binder, the carbon body of the carbon article oxidizes at a slower rate than the carbon deposited from the binder. As a consequence, the residual carbon resulting from the coking of the binder is more readily subject to oxidation or abrasion. Thus, by keying or plugging the anastomozed pores on the surface of a graphite article in whole or in part with silicon nitride, oxidation and abrasion of the exposed graphite particles, particularly those particles derived from the binder material, are reduced.

As an alternative method for carrying out the objects of the invention, the silicon nitride coating may be applied by utilizing the so-called vaporization technique. A suitable container, preferably an aluminum oxide boat, holding a mixture of powdered silicon metal and up to 25% of aluminum oxide is provided in a closed furnace filled with nitrogen gas. The graphite articles to be coated are located above the aluminum oxide boat. Upon heating the furnace contents, the silicon metal vaporizes and reacts with the nitrogen gas to produce silicon nitride which forms as a coating on the exposed surfaces of the graphite articles.

A possible explanation of the mechanism of the vaporization process may be as follows. Upon gradually heating the contents of the furnace, within the temperature range of 1000° C. to 1600° C., the silicon metal reacts with the aluminum oxide to form silicon monoxide vapor, which in the presence of nitrogen is reduced and deposited on the surface of the carbon article as silicon nitride. In this way, a vapor transfer of the silicon reactant is accomplished to effect the formation of a silicon nitride coating on the carbon article.

In practicing the vapor phase coating method, care should be taken that the silicon particles are not so reduced in size as to form an impalpable powder, since if this is done, the nitriding reaction occurs too rapidly, and as a consequence, the coating reaction does not predominate. Consequently, silicon metal of coarse particle size is used to adequately sustain the coating reaction. It has been found that powdered silicon having a 20+100 mesh size (capable of passing through a screen having 0.833 mm. openings, but not passing through a screen having 0.147 mm. openings), and having a purity of 97% is a satisfactory source for initiating the reaction and subsequent deposition of silicon nitride on the carbon article.

Other oxides may be used in the present invention in place of aluminum oxide to facilitate the formation of a silicon nitride coating, and may comprise any suitable oxide reducible by silicon under high temperature conditions.

In addition to the oxidation and abrasion inhibiting characteristics of silicon nitride, its permeating qualities enable it to overspread and fill the microscopic ridges and depressions on the graphite surface. This provides a smoother and more resistant surface. Silicon nitride also possesses high strength and oxidation resistance at elevated temperatures, and stability in many corrosive media.

It will be understood that modifications and variations may be effected without departing from the scope of the novel concepts of the present invention. For example, articles other than carbon articles, but having a carbon coating may equally well be adapted to receive an impervious silicon nitride coating within the intended scope of the present invention.

What is claimed is:

1. A process for improving the resistance to oxidation at high temperatures of a normally fragile graphite article having normally occurring anastomozed pores and imparting abrasion resistance thereto, comprising placing said graphite article in a nitrogen containing furnace, providing in said furnace powdered silicon metal of mesh size 20+100 in contact with the nitrogen in said furnace and aluminum oxide, and heating the contents of said furnace to between 1000° C. and 1600° C. to enable said silicon metal to vaporize and form silicon nitride, and maintaining said temperature for approximately 48 hours to allow a suitable accumulation of silicon nitride deposit to form on exposed surfaces of said article, whereby said silicon nitride is present in the anastomozed pores of said article on the surface thereof and bonded to the anastomozed pores and surface of said article.

2. A method of manufacturing a reinforced heat-resistant carbonaceous article having normally occurring anastomozed pores therein, which method comprises placing said carbonaceous article in a nitrogen containing furnace, disposing powdered silicon metal of about mesh size 20+100 in contact with the nitrogen in said furnace and aluminum oxide, and heating the contents of said furnace to between 1000° C. and 1600° C. to evolve silicon-bearing vapor and form silicon nitride, and maintaining said temperature for approximately 48 hours to allow a suitable accumulation of silicon nitride deposit to form on exposed surfaces of said carbonaceous article, thereby coating the outer exposed surfaces of said article and filling adventitious openings therein, and thereby bonding said silicon nitride to said anastomozed pores and said exposed surfaces.

References Cited in the file of this patent

UNITED STATES PATENTS

| | | |
|---|---|---|
| 448,915 | Erlwein | Mar. 24, 1891 |
| 1,098,794 | Fleming | June 2, 1914 |
| 2,731,359 | Nicholson | Jan. 17, 1956 |
| 2,790,736 | McLaughlin | Apr. 30, 1957 |